May 17, 1966 S. A. AGNEW ET AL 3,251,526
ACTUATING MECHANISM FOR VERTICAL WELDING DAM
Filed July 19, 1963 2 Sheets-Sheet 1
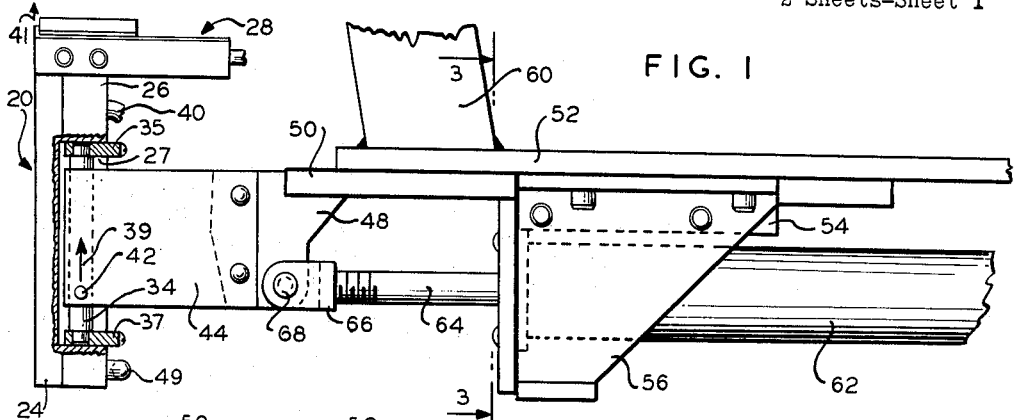
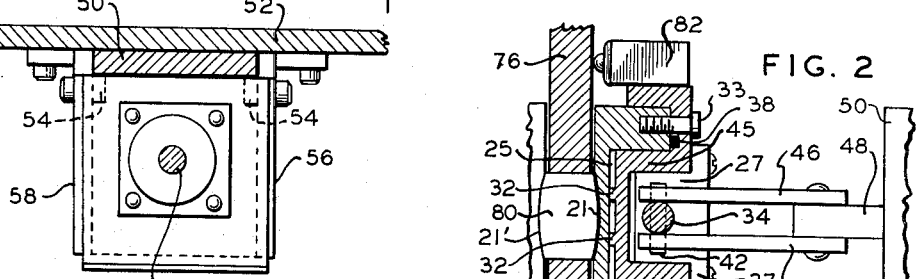
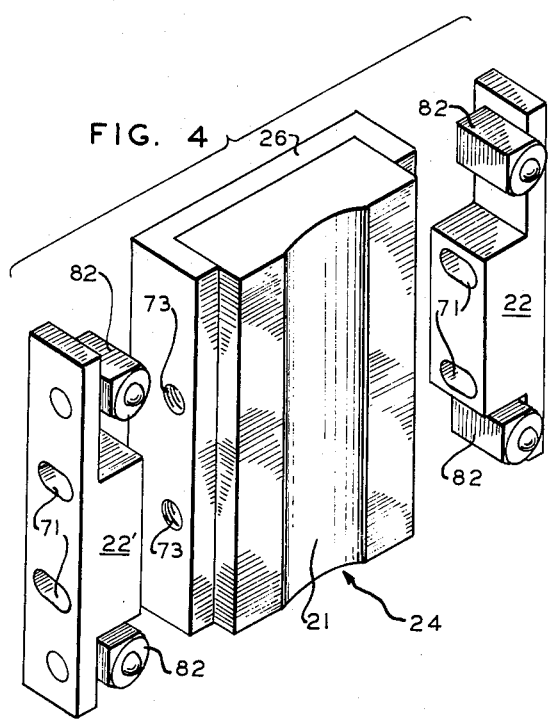
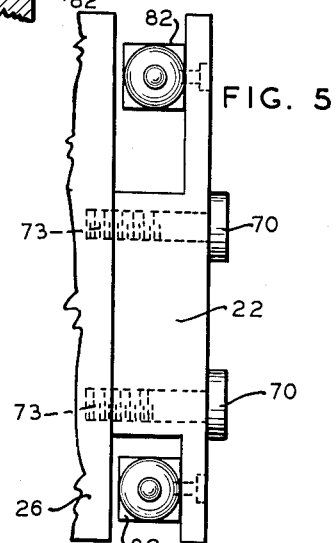
INVENTORS
STANLEY A. AGNEW
EUGENE KOCH
BY FRANK G. FERRAIOLI
John W. Gaines
ATTORNEY

United States Patent Office 3,251,526
Patented May 17, 1966

3,251,526
ACTUATING MECHANISM FOR VERTICAL WELDING DAM
Stanley A. Agnew, New Providence, Eugene Koch, Maplewood, and Frank G. Ferraioli, Berkeley Heights, N.J., assignors to Air Reduction Company, Incorporated, New York, N.Y., a corporation of New York
Filed July 19, 1963, Ser. No. 296,335
4 Claims. (Cl. 228—50)

This invention relates to apparatus for holding molten material and molding molten metal in a generally vertical seam to be welded, during the period while weld metal is being cast into a cavity and while the weld is solidifying. It more particularly relates to means for actuating such apparatus, commonly called a welding dam, when the welding dam is used as a part of a vertical welding machine.

An object of the invention is to permit the welding dam to adapt to irregularities present in the workpieces and present in the alignment of the workpieces at the seam. Warped plates are the principal source of these irregularities of the workpieces. The alignment problem arises chiefly in the respect that in being fitted up, the plates occupy two planes offset from one another.

A related object is to avoid jamming, chattering and undesired tilting of the welding dam as it is being moved upwardly along a seam to be welded, especially in cases where the dam is being pressed against the workpieces by mechanical means while said upward motion is taking place.

Another related object is to assure that a welding dam, or two opposed welding dams on opposite sides of the workpieces, will seal the welding cavity sufficiently to substantially prevent leakage or seepage of molten material, whether the welding apparatus is flexibly or more or less inflexibly mounted with reference to the workpieces.

Another object is to reduce the amount of heat passing from the workpieces to the dam. This reduction leaves more heat available so that thicker pieces can be welded. The advantages flowing from this feature are particularly significant with high heat conductivity workpieces such as aluminum. Thus, the chilling (by the heat dam) of the adjacent outer corners of the workpieces can be avoided and deep weld penetration results.

A feature of the invention is an improved positioning of a pivotal joint between a welding dam and the means for pressing the dam against workpieces, whereby the joint lies much closer to the plane of the workpieces than in prior art devices. This improvement permits the welding dam to adapt to irregularities present in the workpieces and in the alignment of the workpieces at the seam.

Our apparatus has the flexibility to rotate about a vertical axis but, compared to prior welding apparatuses, we reduce the amount of the rotational movement required by our particular construction of this apparatus in making adjustment to a given misalignment of the workpieces.

Another feature lies in the fact that two axes in the said pivotal joint are mutually perpendicular.

Another feature is that the said axes intersect each other close to the plane of the workpieces.

Another feature is that the point of application of force to the dam to hold the dam against the workpieces is located below the geometrical center of the dam as measured between the top and bottom boundaries of the dam, the preferred location being about one-third of the way from the bottom of the dam to its top.

Another feature is the provision of friction reducing members for use with a welding dam, which members have the added function of maintaining a small clearance space between the workpieces and the welding dam to reduce heat transfer from the weld to the welding dam without allowing leakage or seepage of molten material from the weld.

Other features, objects and advantages will appear from the following more detailed description of an illustrative embodiment of the invention, which will now be given in conjunction with the accompanying drawings.

In the drawings,

FIG. 1 is an elevational view of part of a welding apparatus including a welding dam with actuating mechanism therefor in accordance with the invention;

FIG. 2 is a plan view mainly in cross section, showing one dam in operative relation to a weld and workpieces, together with a portion of the actuating mechanism for said dam, and showing the cooperative relation of a similar second dam on the opposite side of the weld and workpieces;

FIG. 3 is a transverse vertical cross-sectional view of a portion of the welding dam actuating mechanism as viewed along the line 3—3 in FIG. 1;

FIG. 4 is a perspective view of the shoe of the welding dam and a support member for the shoe, together with demountable friction reducing members, shown detached, for lessening friction between the dam and the workpieces, which friction reducing members are useful for welding under certain conditions;

FIG. 5 is an elevational view showing one of the friction reducing members mounted in place upon the support member for the shoe.

Figure 6:
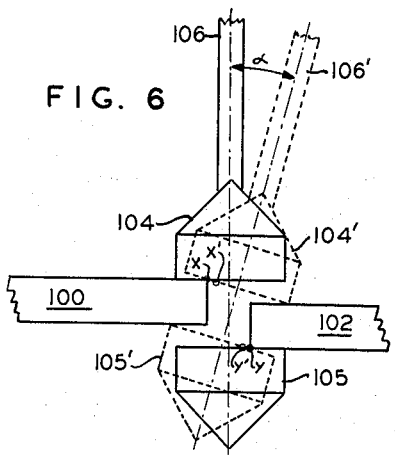
FIGS. 6-10 are diagrams useful in explaining certain advantages of the invention.

Referring to FIG. 1, a welding dam assembly is shown at 20 comprising a shoe 24 and a support member 26 therefor, which appear in horizontal section in FIG. 2 and in perspective in FIG. 4. Mounted on top of the assembly 20 in FIG. 1 is shown a gas box 28 for supplying shielding gases to an arc cavity which may be formed by two opposing shoes and a pair of workpieces which are to be welded together in a generally vertical seam. In the face of the support member 26 opposite the shoe 24 there is machined or otherwise formed a cavity 27 in which is mounted a vertical pivot 34 of a pivotal joint. The pivot 34 may be mounted in suitable upper and lower bearing members 35 and 37, respectively, which may be bolted to the rear face of the support member 26 as shown. A horizontal pivot for the pivotal joint is provided by a pin 42 placed on a diameter of the member 34, preferably at a distance from the bottom edge of the shoe 24 equal to approximately one-third of the vertical dimension of the shoe 24, and extending horizontally, parallel to the working face of the shoe. The pin 42 is pivoted to a pair of connecting plates 44, 46 as shown in FIGS. 1 and 2. The plates 44 and 46 are fastened to opposite faces of a bracket member 48 which in turn is fastened to a slider 50. The slider 50 and parts attached thereto are movable relatively to a table member 52 (FIGS. 1 and 3), the slider 50 sliding on steel bearing bars 54 supported on brackets 56, 58 attached to the underside of the table 52, which arrangement provides a narrow slide way for the slider 50 between the bars 54 and the underside of the table 52.

Other parts of a welding machine may be mounted upon the upper surface of the table 52, one of which parts consists of an arm 60 which is shown fragmentarily.

The brackets 56, 58 also support a pneumatic cylinder 62 from which extends a piston rod 64 which has a forked end member 66 that is secured to the bracket 48 by means of a pin 68.

FIGS. 2, 4 and 5 show friction reducing bearing members 22 and 22' demountably attached to the support member 26. The members 22 and 22' carry means such as ball and socket bearings 82 which roll upon the workpieces as indicated in FIG. 2 and maintain a slight adjustable clearance between the shoe and the workpieces. Bolts 70 may be inserted through clearance slots 71 in the members 22, 22' into threaded engagements 73 in the support member 26, the slots permitting the desired adjustment of the spacing between the shoe and the workpieces.

In the operation of the devices disclosed, actuation of the cylinder 62 causes the piston rod 64 to move the bracket 48, slider 50 and attached parts so as to yieldingly press the shoe 24 or members 22, 22' if used, against the workpieces 76, 78 to be welded, shown in cross-section in FIG. 2. An opposing or back-up shoe 24' is held against the other side of the workpieces, by means of a rigid C-shaped structure secured to and formed as an integral part of the arm 60. A portion of the solidified weld is shown at 80.

The means for introducing consumable electrode wire into the cavity in which the molten wire metal is being cast is shown and described in copending Agnew, Koch, and Ferraioli application Serial No. 296,349.

The use of the friction-reducing members 22, 22' not only produces smoother operation by reducing the friction between the shoe and the workpiece but when a material clearance is maintained thereby between the workpieces and the shoe also reduces heat transfer from the weld and workpiece to the shoe, thus reducing cooling of the weld by heat loss to the shoe, advantage of which effect may be taken when desired.

The force of the piston is applied to the welding dam through the pivot 42 and then through the pivot 34, which combination permits the shoe to adapt to irregularities in the workpieces at the seam. Mechanism (not shown) is provided in known manner for gradually raising the table 52, slider 50 and attached parts during welding of a vertical seam. The forces for holding the welding dam against the workpieces and moving the dam in upward relation to the workpieces in the embodiment illustrated are both applied through the intersecting pivots 42 and 34. It will be evident that a rotary motion of the welding dam assembly about the upper workpiece edge of the shoe will not occur if the force to raise the shoe is applied in the plane of the workpiece contacting surface of the shoe, in which case the force would exert no torque about the upper workpiece edge of the shoe. As it is usually not practical to apply the lifting force in such manner, there will be such a torque developed and it is desirable to keep the amount of this torque small by placing the plane of application of the lifting force as close to the workpiece contacting surface of the shoe as possible, as shown in FIGS. 1 and 2.

The optimum position of application of the horizontal force, both for holding the shoe against the workpieces and for offsetting the effect of the said torque, has been found to be below the geometrical center of the vertical dimension of the shoe, preferably about one-third of the way up from the bottom of the shoe. For simplicity, as shown by arrow 39 in FIG. 1, the vertical force is applied through the same point. Any tendency for the shoe to skew like a sled on account of the application of the vertical force below the center of the shoe will be offset by good machining practice which will assure that the freedom to skew, that is to rotate about the axis of the piston rod 64, will be restricted within sufficiently narrow limits so that the vertical center line of the shoe remains substantially in line with the seam as the shoe is raised.

In the interest of preventing skewing, it is advantageous to apply the lifting force from above the welding dam assembly, as closely as possible to the upper workpiece edge of the shoe, as indicated by arrow 41 in FIG. 1, so that, as in towing a sled, the shoe will automatically remain vertical and track the seam.

The magnitude of the horizontal force as related to its point of application needs consideration in two respects. First, the horizontal force must hold the shoe positively against the workpieces and retain the molten weld pool in place, and, second, it must offset the tendency of any torque created by the lifting force to rotate the shoe about its upper workpiece edge. In the latter case, a large horizontal force applied at a point high on the welding dam assembly would suffice but would also act to impose high frictional forces between the shoe and the workpieces which would need to be overcome by the lifting force. An advantageous compromise in magnitude and point of application has been found to be a relatively small force applied at a point about one-third of the vertical dimension of the shoe above the bottom edge of the shoe. We have found a force of about 70 pounds to be sufficient for the present configuration of equipment.

The construction described herein successfully prevents the upper edge of the shoe, or any other part of the shoe from digging into the workpieces or jumping discontinuously over the workpieces as the welding machine is raised during the upward progress of the welding operation. The construction whereby the axes of the two pivots of the pivotal joint substantially intersect permits location of the point of application of the lifting force closer to the plane of the workpiece than possible in prior art constructions inasmuch as the space occupied by the pivotal joint in the direction between the workpiece and the piston rod is reduced by the construction described herein.

FIGS. 6–10 deal diagrammatically with an operating difficulty encountered when there is a misalignment of the workpieces at the two sides of the seam, and to the reasons therefor and certain solutions thereto. The workpieces are shown misaligned to an exaggerated degree for the purpose of clarity.

FIG. 6 represents the case wherein the welding apparatus is so mounted as to permit its complete freedom of movement in any manner necessary to allow a pair of dams 104 and 105 to enclose the gap between misaligned workpieces 100 and 102. The piston rod 106 is shown solidly attached to dam 104 to represent the case in which any pivot point of the welding apparatus is infinitely far from the plane of the workpieces. Dams 104 and 105 must retain their geometrical relationship to each other due to their rigid interconnection by the apparatus frame members, represented by a broken center line in FIG. 6, which frame members are solidly connected to dam 105 as well as to dam 104. It will be evident from FIG. 6 that in order to prevent molten material from leaking from the welding cavity by means of the dams it is required that the dams 104 and 105 rotate initially about their points of contact X and Y with workpieces 100 and 102 respectively. It will be observed that if the dams were free to independently rotate about these separate points, no difficulty would ensue. However, they are prevented from doing this by their rigid interconnections, as above described, necessitating that the system rotate about some single point at any given instant. In FIG. 6, for illustration, the point of rotation shown for the system is located where the original and final center lines of the apparatus intersect in the welding cavity. For rotation about this point, the dams, which are held in contact with the workpieces by a yieldable clamping force applied to the rod 106, must slide against the workpiece corners through the distance indicated by line segments X–X' and Y–Y' as they assume their sole closure position as shown at 104' and 105' respectively. Regardless of the choice of simulated rotations and translations used to obtain the closure positions of the dams for the general case illustrated, the closure positions are those illustrated in FIG. 6. Any change in position causes an opening from the cavity to occur.

Figure 7:
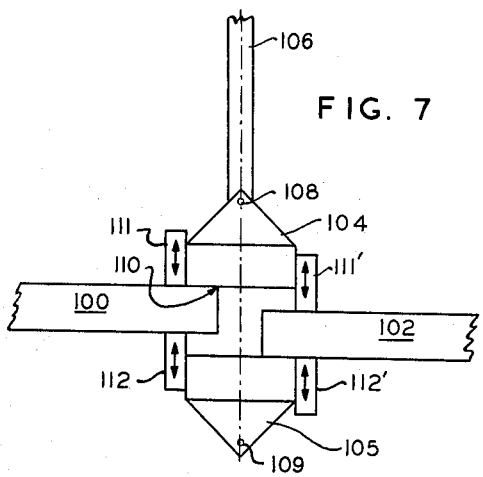

FIG. 7 presents the case wherein the welding apparatus is so mounted as to be inflexible except for the yieldable clamping of the dams against the workpieces. Pivots 108 and 109 are located as illustrated and are considered to have been moved in from the position of infinite distance from the workpieces represented by FIG. 6. However, since the machine frame is rigidly mounted and cannot move relative to the workpieces, the pivots can serve no purpose. To close the openings between dams and workpieces, between 104 and 102, and between 105 and 100, respectively, wing dams are necessary and have been so used in the prior art. FIG. 7 shows wing dams 111 and 112 which are yieldably mounted to press against workpiece 100 and wing dams 111' and 112' which are yieldably mounted to press against workpieces 102, in the manner used in the prior art.

Figure 8:
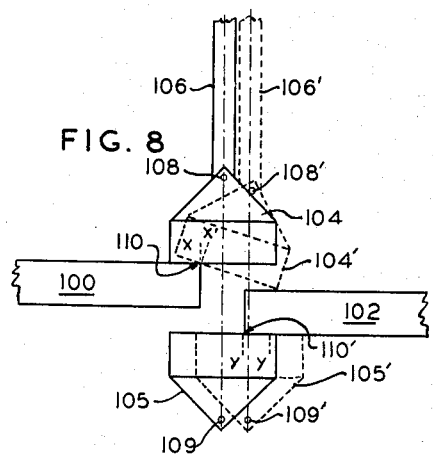

FIG. 8 presents the case wherein the welding apparatus is so mounted as to permit movement only parallel to the plane of the workpiece in addition to the yieldable clamping of the dams against the workpieces. While the apparatus as a whole cannot rotate, the dams can. Suppose that dam 104 rotates about its point of contact X with workpiece 100, thus sealing the gap between the dam 104 and the workpiece 102, as shown with the dam 104 in dotted position 104'. This movement, however, retains the original gap between dam 105 and workpiece 100. On the other hand, movement of the apparatus to close the latter opening will return the dam 104 to its original position. It is thus obvious that wing dams are required in this case as well.

Figure 9:
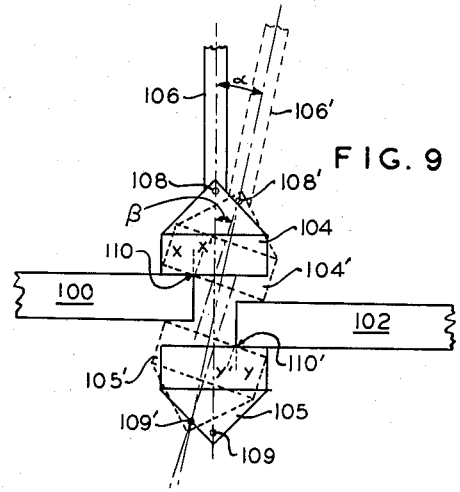

FIG. 9 presents the case shown in FIG. 8 with the added condition that the welding apparatus has been modified to allow rotation of the welding apparatus as well as rotation of the dams. This allows both dams 104, 105 to rotate about their respective points of contact X and Y with workpieces 100 and 102, to effect closure without sliding of the dams over the workpieces. It will be noted that the apparatus rotates about the center point of the welding cavity as in FIG. 6, as evidenced by the point of intersection of the original and final positions of the center line of the apparatus. However, it will also be noted by comparing FIG. 9 with FIG. 6 that moving the pivots 108 and 109 toward the workpieces from infinity as represented in FIG. 6 to the position shown in FIG. 9 has caused little reduction in the angle α through which the welding apparatus must rotate.

Figure 10:
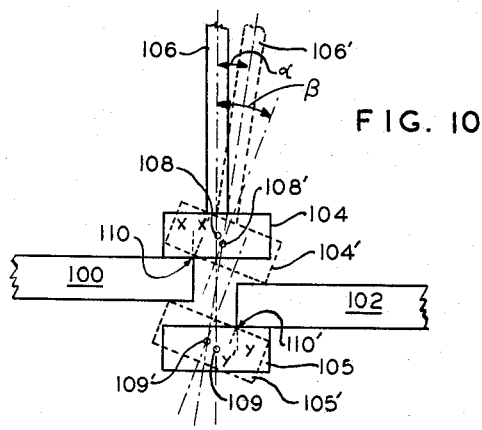

In FIG. 10, a slight but important change has been made from the arrangement shown in FIG. 9. In accordance with the invention, the pivots 108, 109 have been moved in close to the workpieces. Now, whereas the transfer of the pivots from infinity, FIG. 6, to the positions shown in FIG. 9 had but little effect as noted just above, the relatively slight additional change in the pivot point locations between the case of FIG. 9 and the case of FIG. 10 produces a very significant result. In this connection it will be seen from inspection of FIGS. 9 and 10 that the angle, designated β, through which the dams rotate is different from the angle α through which the welding machine rotates. While the angle β is the same in FIGS. 9 and 10, the angle α in FIG. 10 is much smaller than the angle α in FIG. 9, showing that for a given rotation of the dams, the necessary rotation of the welding machine is greatly reduced by moving the pivot points 108, 109 in close to the workpieces. It will now be evident that placing the pivots 108, 109 very close to the plane of the workpieces will allow closure of the welding cavity by the dams, for reasonable misalignment of the workpieces, even if the welding apparatus is quite rigidly mounted, and thus obviates the necessity for wing dams as used in the prior art. For flexible apparatus mounting means, the positioning of pivots 108, 109 very close to the plane of the workpieces is similarly desirable since only very minor rotations of the welding machine from its desired rest position perpendicular to the plane of the workpieces are necessary to maintain closure of the welding cavity for reasonable misalignment of the workpieces. Stabilizers for maintaining the welding apparatus in the desired rest position within close limits in order to guard against accidental rotation of the apparatus may be provided, as disclosed in copending Agnew, Koch and Ferraioli application Serial No. 296,349, without impairing the ability of the dams to maintain closure of the welding cavity.

The rigid C-shaped structure, not shown, secured to the arm 60 and holding the back-up shoe 24' is more completely described and shown in copending Agnew, Koch, and Ferraioli application Serial No. 296,349.

While illustrative forms of apparatus and methods in accordance with the invention have been described and shown herein, it will be understood that numerous changes may be made without departing from the general principles and scope of the invention.

What is claimed is:

1. Apparatus for actuating a welding dam assembly while in generally vertical motion during a welding operation, said welding dam assembly comprising a shoe and support member lying between two planes, one of said planes being a working face adapted to contact the workpiece and the other of said planes being defined by the extremity of the support opposite said working face, said actuating apparatus comprising, in combination, mechanical means to press said welding dam against a workpiece, a linkage interposed between said mechanical pressing means and said welding dam, said linkage including cooperating intersecting pivots, one of which is generally vertically extending and the other of which is generally horizontally extending, said pivots being located between said two planes sufficiently close to the working face of the welding dam to permit the said mechanical pressing means to maintain the working face of the welding dam in such position at substantially all times as to prevent leakage or seepage of molten material from the weld through a space between the workpiece and the working face of the welding dam while requiring a minimum of flexibility in the mounting of said mechanical pressing means.

2. In a continuous substantially vertical welding apparatus, in combination, a welding dam assembly comprising a shoe and support member lying between two planes, one of said planes being a working surface for confining fluid material in a gap between workpieces to be welded together to form a seam at said gap, and the other of said planes being defined by the extremity of the support opposite said working surface, pressing means for urging said welding dam against the workpieces, pivotal joint means connecting said welding dam and said pressing means, said pivotal joint means being adapted for motion about a substantially vertical axis and being located between said two planes sufficiently close to said working surface of the welding dam to permit the welding dam to be rotated about said vertical axis by said pressing means together with the reaction of a workpiece, so that the said working surface of the welding dam is accommodated to irregularities in the workpieces and in the alignment thereof at the said gap while the welding dam is being pressed against the workpieces by said pressing means, and while requiring a substantially negligible amount of displacement of said pressing means as a whole in the course of said rotation of the welding dam.

3. Apparatus according to claim 2, in which the said pivotal joint means comprises mutually perpendicular intersecting first and second pivots, both said pivot axes being parallel to the working face of said welding dam, and one of said pivot axes being also parallel to said gap between the workpieces.

4. Apparatus according to claim 2, in which the said shoe is recessed at the side thereof away from said working surface to accommodate said pivotal joint means, thereby permitting placing of the said pivotal joint means closer to said working surface than otherwise possible.

References Cited by the Examiner

UNITED STATES PATENTS

| | | | |
|---|---|---|---|
| 2,395,723 | 2/1946 | Chmielewski | 219—126 |
| 2,742,553 | 4/1956 | Meyer | 219—126 |
| 3,046,386 | 7/1962 | Wooding et al. | 113—136 |
| 3,170,430 | 2/1965 | Bistak | 113—99 |

WHITMORE A. WILTZ, *Primary Examiner.*

CHARLES W. LANHAM, *Examiner.*

M. L. FAIGUS, *Assistant Examiner.*